United States Patent
Akita et al.

(10) Patent No.: US 6,303,053 B1
(45) Date of Patent: Oct. 16, 2001

(54) METHOD FOR PRODUCING META TYPE POLYANILINE

(75) Inventors: Hiroshi Akita; Masao Ichikawa; Masaru Iguchi; Hiroyuki Oyanagi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/664,086

(22) Filed: Sep. 18, 2000

(30) Foreign Application Priority Data

Sep. 20, 1999 (JP) ................................. 11-265116

(51) Int. Cl.[7] .................................................. H01B 1/12
(52) U.S. Cl. .......................... 252/500; 528/210; 528/422
(58) Field of Search .......................... 252/500; 528/210, 528/422

(56) References Cited

U.S. PATENT DOCUMENTS

| | | | |
|---|---|---|---|
| 4,629,540 | 12/1986 | Genieés et al. | 204/59 R |
| 5,276,112 | 1/1994 | MacDiarmid et al. | 525/540 |
| 5,436,317 | 7/1995 | Järvinen et al. | 528/422 |
| 5,519,111 | 5/1996 | MacDiarmid et al. | 528/422 |
| 5,792,830 | 8/1998 | Noding et al. | 528/422 |
| 6,030,551 | 2/2000 | Ho et al. | 252/500 |
| 6,241,913 | * 6/2001 | Angelopoulos et al. | 252/500 |

OTHER PUBLICATIONS

Ward et al "Inhibition of crosslinking in meta–polyaniline through the use of n–protecting groups", Polymer Preprints, 39(2), Aug. 1998, p. 593.*

Spetseris et al "Liner and hyperbranched m–polyaniline synthesis of polymers for the study of magnetism . . . ", Macromolecules, 31, 3158–3161, 1998.*

Tang et al "Electropolyermization of aniline modified by para–phenylenediamine", Electrochimica Acta, 40(7), pp. 849–857, 1995.*

* cited by examiner

*Primary Examiner*—Mark Kopec
(74) *Attorney, Agent, or Firm*—Lahive & Cockfield, LLP

(57) ABSTRACT

A novel method for producing a meta type polyaniline, comprising polymerizing aniline in at least one organic solvent selected from N-methyl-2-pyrrolidone, N,N-dimethyl sulfoxide, N,N-dimethylacetamide and N,N-dimethylformamide, in the presence of at least one oxidizing agent selected from ammonium peroxodisulfate, iron(III) chloride, manganese dioxide and hydrogen peroxide, at −20° C. to 50° C.

3 Claims, 2 Drawing Sheets

—○— Meta type polyaniline
(doped with 0.75 molecule/NH group)

----△---- PBI (doped with
1.0 molecule/NH group)

A ; Peaks assigned to para type phenyl groups of a para type polyaniline

B ; Peaks assigned to meta type phenyl groups of a meta type polyaniline

—○— Meta type polyaniline (doped with 0.75 molecule/NH group)

----△---- PBI (doped with 1.0 molecule/NH group)

METHOD FOR PRODUCING META TYPE POLYANILINE

FIELD OF THE INVENTION

The present invention relates to a novel method for producing a meta type polyaniline, and more particularly to a method for producing a meta type polyaniline which comprises polymerizing aniline in water or a specified organic solvent at a specified temperature with a specified catalyst (oxidizing agent) added.

BACKGROUND OF THE INVENTION

In recent years, fuel cells have occupied an important position as next generation type clean energy sources. A solid polymer electrolyte used in a direct methanol type fuel cell (hereinafter referred to as a "DMFC") in which methanol is used as a fuel requires high proton conductivity and methanol barrier property.

As solid polymer electrolyte materials satisfying such requirements, hydrated membranes of perfluorosulfonic acid polymers such as Nafion (trade name) manufactured by E. I. du Pont de Nemours and Company) have generally been used. However, the hydrated membranes of perfluorosulfonic acid polymers have a limitation with regard to the methanol barrier property, because they are hydrated.

Besides, as a polymer having proton conductivity independent of water, polybenzimidazole (PBI) doped with a strong acid such as phosphoric acid (hereinafter referred to as "acid-doped PBI") is known. However, the acid-doped PBI membranes have the disadvantage that elimination of dopants such as inorganic acids is liable to occur in an atmosphere of water/methanol (liquid fuel). The present inventors have previously invented acid-doped PBI membranes in which dopant elimination is difficult to occur, and which are excellent in methanol barrier property by using diphenylphosphoric acid as a dopant in an amount of one molecule per N—H group in PBI (Japanese Unexamined Patent Publication No. 2000-38472).

For improving the low proton conductivity, a problem of the above-mentioned acid-doped PBI membranes, it is preferred that the N—H group density of base polymers is increased and that the density of acid components coordinated to the N—H groups is increased. Further, for conducting protons in the solid polymer electrolyte membranes, the base polymers preferably have a low glass transition temperature (Tg) and a flexible molecular structure. Furthermore, from the viewpoint of chemical stability required for the solid polymer electrolyte membranes used in fuel cells, the proton conducting polymers are preferably aromatic polymers.

The base polymers satisfying such requirements include polyanilines. The molecular structure thereof is simpler than that of PBI, and the N—H group density thereof is high.

The polyanilines include a polyaniline in which aromatic rings are bonded at the para-positions (hereinafter referred to as a "para type polyaniline"), and a polyaniline in which aromatic rings are bonded at the meta-positions (hereinafter referred to as a "meta type polyaniline").

It is known that the para type polyanilines are synthesized by various methods such as chemical oxidation and electrochemical oxidation. The physical properties of the para type polyanilines obtained vary depending on the synthesis method. For example, it is known that a polymer containing the para type polyaniline structure is obtained by polymerization of aniline in an aqueous solution of sulfuric acid in the presence of an oxidizing agent such as ammonium peroxodisulfate. In the production of the para type polyanilines, aniline, a starting material for dyes, is used as a raw material, so that they are produced at low cost. The para type polyaniline has a π conjugate structure, so that the para type polyaniline itself has electrical conductivity, and of the conductive polymers, it is relatively high in stability. Accordingly, although an acid-doped para type polyaniline obtained by doping the para type polyaniline with an acid component shows proton conductivity, it can not be used as a material for the solid polymer electrolyte membrane used in the fuel cell.

On the other hand, the meta type polyaniline can not have a π conjugate structure, so that it can not exhibit electrical conductivity as it is.

However, the meta type polyaniline has proton selective permeability (proton conductivity). Accordingly, there is an example in which it is evaluated as a PH sensor usable in metal ion-containing solutions [Onuki, Matsuda and Koyama, *Nippon Kagaku Kaishi*, 11, 1801 (1984)]. Further, the meta type polyaniline has a flexible molecular structure, compared with the above-mentioned para type polyaniline. Like this, the meta type polyaniline having no electrical conductivity and having the flexible molecular structure is anticipated to exhibit the proton conductivity by doping with an acid component (hereinafter referred to as "acid doping"), when the acid doping is possible, and the application as a novel solid polymer electrolyte material for fuel cells is expected.

Furthermore, as an electrode used in a solid polymer electrolyte type fuel cell, a so-called MEA (membrane electrode assembly) is known. In the MEA, electrodes are formed of fine catalyst particles prepared by allowing carbon to support a noble metal, a solid polymer electrolyte component formed on surfaces of the fine catalyst particles, and a fluorine resin for adhering the fine catalyst particles to one another. The electrodes are each arranged on two main planes of a solid polymer electrolyte membrane, thereby constituting a fuel cell (Japanese Unexamined Patent Publication No. 5-36418).

The polyaniline and the acid-doped polyaniline (hereinafter referred to as an "acid-doped polyaniline"), that is to say, the proton conducting polymers, are used as the solid polymer electrolyte components formed on the surfaces of the fine catalyst particles, when they are high in proton conductivity, and they are expected to be used as novel electrode catalysts for fuel cells.

However, for synthesis methods of the meta type polyanilines, only a few examples of electrolytic polymerization of aniline under special conditions are reported [T. Ohsaka et al., *J. Electroanal. Chem.*, 161, 399 (1984), A. Volkov et al., *J. Electroanal. Chem.*, 115, 279 (1980), and Onuki, Matsuda and Koyama, *Nippon Kagaku Kaishi*, 11, 1801 (1984)]. Thus, the development of novel synthesis methods of the meta type polyanilines used for various applications has been expected.

SUMMARY OF THE INVENITON

The present invention has been made against a background of the problems as described above, and an object of the invention is to provide a novel method for producing a meta type polyaniline.

The present inventors have conducted intensive investigation for attaining the above-mentioned object. As a result, the inventors have discovered that a meta type polyaniline can be selectively produced by polymerizing aniline in water or a specified organic solvent at a specified temperature with a specified catalyst added, thus completing the invention.

The invention provides a method for producing a meta type polyaniline, which comprises polymerizing aniline in water or at least one organic solvent selected from the group consisting of N-methyl-2-pyrrolidone, N,N-dimethyl sulfoxide, N,N-dimethylacetamide and N,N-dimethylformamide, in the presence of at least one oxidizing agent selected from the group consisting of ammonium peroxodisulfate, iron(III) chloride, manganese dioxide and hydrogen peroxide, at −20° C. to 50° C.

When the polymerization reaction is conducted in water in the above-mentioned method, and the PH of a reaction solution in which the polymerization reaction is conducted is preferably 7 or more.

The above-mentioned aniline may have at least one substituent on its aromatic ring.

BRIEF DESCRIPTION OF THE DRAWINGS

These and other objects and advantages of this invention will become more apparent and more readily appreciated from the following detailed description of the presently preferred exemplary embodiments of the invention taken in conjunction with accompanying drawings, of which.

DESCRIPTION OF THE PREFERRED EMBODIMENTS

Figure 1:
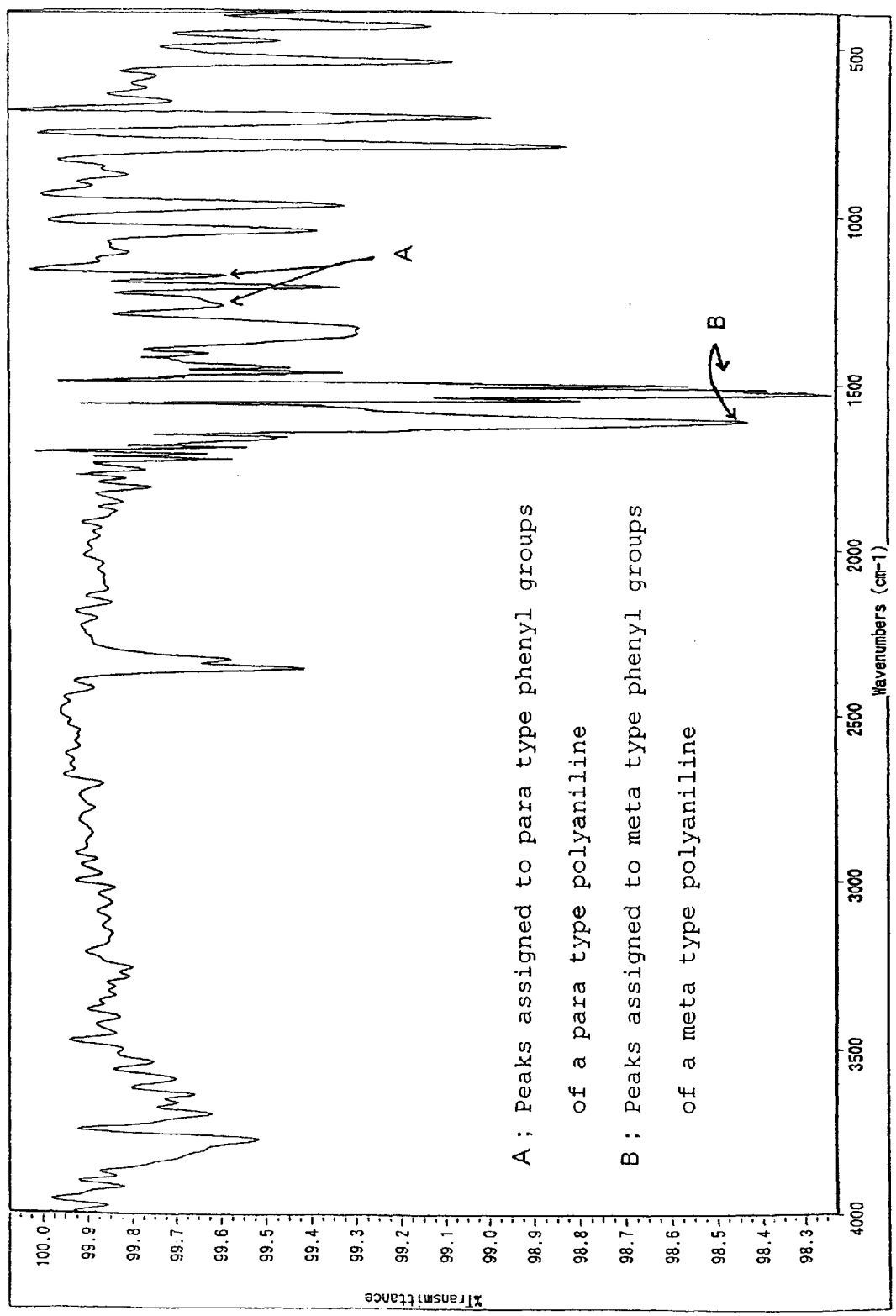
FIG. 1 is an IR chart of an acid-doped meta type polyaniline obtained by blending a meta type polyaniline obtained in Example 1 with diphenylphosphoric acid in an amount of 0.5 molecule per repeating unit, and casting the resulting mixture.

The invention provides a method for producing a meta type polyaniline, which comprises polymerizing aniline in water or an organic solvent. The polymerization reaction is chemical oxidation polymerization, and one example of the reaction is indicated by the following reaction scheme (I):

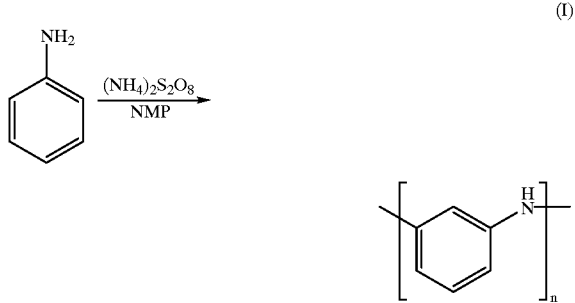

In the above-mentioned method, aniline is dissolved in water or the organic solvent, and allowed to react in the presence of the oxidizing agent within the specified temperature range. Then, the reaction solution is poured in deionized water to conduct reprecipitation, thereby obtaining a meta type polyaniline as a solid material. The solid material thus obtained is repeatedly washed with deionized water and acetone, then washed with deionized water and vacuum dried.

The aniline used as a starting material may have at least one substituent on its aromatic ring. The number of the substituent(s) is from 1 to 5, and preferably 1 or 2.

The aniline derivatives having the substituents used as a starting material include toluidine, anisidine, aminobenzoic acid, aminobenzotrifluoride and phenylenediamine.

Using the aniline derivatives having the substituents as a starting material, a polyaniline having at least one substituent at the aromatic rings in the repeating units thereof can be obtained.

The organic solvents include organic solvents such as N-methyl-2-pyrrolidone (NMP), N,N-dimethylsulfoxide (DMSO), N,N-dimethylacetamide (DMAc) and N,N-dimethylformamide (DMF), and preferred is NMP.

The amount of water or the organic solvent used is preferably from 1 to 100 parts by volume, and more preferably from 5 to 50 parts by volume, based on part by volume of aniline, the starting material. Less than 1 part by volume induces gelation of the product, whereas exceeding 100 parts by volume results in a decrease in the molecular weight of the resulting meta type polyaniline.

The polymerization reaction is conducted by dissolving aniline in water or the organic solvent, and adding the oxidizing agent to the resulting aniline solution at −20° C. to 50° C., preferably −10° C. to 20° C., more preferably at −5° C. to 0° C. A temperature of less than −20° C. retards the progress of the reaction, whereas exceeding 50° C. results in a decrease in the molecular weight of the resulting meta type polyaniline.

The oxidizing agents include ammonium peroxodisulfate, iron(III) chloride, manganese dioxide and hydrogen peroxide, and preferred is ammonium peroxodisulfate.

Method for adding the oxidizing agent to the aniline solution include a method of adding the oxidizing agent as it is, or a method of adding a solution of the oxidizing agent in a solvent all at once or taking a time.

The solvents include water, NMP, DMSO, DMAc and DMF, and preferably water and NMP.

The addition is perfomed all at once, or for 30 minutes to 72 hours, preferably for 2 hours to 36 hours, more preferably for 12 hours to 24 hours.

After the addition of the oxidizing agent, the solution is stirred for 3 hours to 24 hours, preferably 6 hours to 12 hours, more preferably overnight while gradually lowering the temperature of the solution to room temperature, thereby finishing the reaction. After the reaction is finished, the reaction solution is poured into a large excess of deionized water to conduct reprecipitation, thereby obtaining a meta type polyaniline as solid material. The solid material thus obtained is repeatedly washed with deionized water and acetone, followed by washing with deionized water. Then, the solid material is vacuum dried at room temperature to 200° C., preferably at about 100° C.

FIG. 1 is a chart of a proton conducting polymer film obtained by blending a meta type polyaniline obtained by the above-mentioned method with diphenylphosphoric acid in an amount of 0.5 molecule per repeating unit, and casting the resulting mixture. As shown in FIG. 1, the formation of the meta type polyaniline is confirmed by the presence of peaks at 1,530 cm$^{-1}$ and 1,610 cm$^{-1}$ assigned to phenyl groups bonded at the meta-positions. By the presence of peaks at 1,170 cm$^{-1}$ and 1,250 cm$^{-1}$, it is confirmed that the para type polyaniline is also formed in small amounts.

As to the bonding of aromatic rings in repeating units of the polyaniline obtained by this manufacturing method, usually 60 mole percent or more, preferably 70 mole percent or more, and more preferably 80 mole percent or more of the aromatic rings are bonded at the meta-positions.

For increasing the bonding ratio at the meta-positions, the reaction solvent is changed from a conventional acidic aqueous solution to a neutral to alkaline aqueous solution or an organic solvent, and the addition speed of the oxidizing agent is decreased. This method can minimize the amount of a substance represented by the following formula (II), which is stable and highly reactive in an acidic solution, and liable to form the para type polyaniline in polymerization.

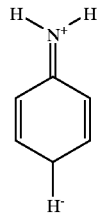

(II)

In the invention, a polyaniline in which 70 mole percent or more of the aromatic rings are bonded at the meta-positions is referred to as a meta type polyaniline. The above-mentioned formation ratio is calculated from the area ratio of absorption peaks of phenyl groups assigned to the respective compositions, which is determined by the IR measurement.

The molecular weight of the meta type polyaniline obtained depends on the time taken to add the oxidizing agent. For example, when the concentration of aniline contained in the reaction solution is 6.7% by volume, addition of the oxidizing agent all at once gives a inherent viscosity ($\eta_{inh}$) of 0.07, addition thereof for 6 hours gives a inherent viscosity ($\eta_{inh}$) of 0.13, and addition thereof for 12 hours gives a inherent viscosity ($\eta_{inh}$) of 0.22.

Further, the molecular weight of the meta type polyaniline also depends on the solution concentration. For example, when the oxidizing agent is added for 12 hours, a concentration of aniline in the reaction solution of 6.7% by volume gives a inherent viscosity ($\eta_{inh}$) of 0.22, and a concentration of 13.3% by volume gives a inherent viscosity ($\eta_{inh}$) of 1.14.

When the polymerization reaction is conducted in water, the PH of the reaction solution is kept preferably at 7 or more, and more preferably at 10 to 14. When the PH of the reaction solution is less than 7, the formation of the para type polyaniline increases to generate electrical conductivity, therefore becoming inadequate for the solid polymer electrolyte membrane application. The PH is adjusted by using a 0.1 to 2 M aqueous solution of NaOH or KOH as the reaction solution, and controlling the concentration of NaOH or KOH.

The meta type polyaniline of the invention can be doped with (immersed in) a strong acid or an acid compound to form an acid-doped meta type polyaniline, that is to say, a proton conducting polymer.

Dopants used in doping include phosphoric acid, sulfonic acid and sulfuric acid as the strong acids. Phosphoric acid and sulfuric acid are preferred among others. The acid compounds include acid compounds in which hydrogen atoms of sulfuric acid, sulfonic acid, phosphoric acid, phosphorous acid and the like are substituted by phenyl group-containing functional groups.

Of the acid compounds, an acid compound in which a hydrogen atom of phosphoric acid is substituted by a phenyl group-containing functional group, that is to say, an organic phosphoric acid compound, is preferred. The organic phosphoric acid compounds include phenylphosphoric acid derivatives represented by the following general formula (III) and diphenylphosphoric acid derivatives represented by the following general formula (IV):

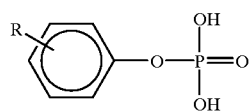

(III)

wherein R represents a hydrogen atom, an alkyl group having 1 to 5 carbon atoms, a halogen atom or a nitro group;

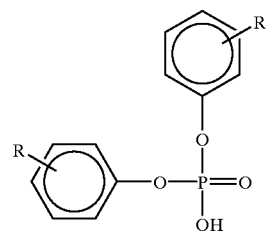

(IV)

wherein R represents a hydrogen atom, an alkyl group having 1 to 5 carbon atoms, a halogen atom or a nitro group.

Examples of the phenylphosphoric acid derivatives include alkyl-substituted phenylphosphoric acids such as phenylphosphoric acid, o-toluylphosphoric acid, p-toluylphosphoric acid, o-ethylphenylphosphoric acid, p-ethylphenylphosphoric acid and p-isopropylphenylphosphoric acid; halogen-substituted phenylphosphoric acids such as o-chlorophenylphosphoric acid, p-chlorophenylphosphoric acid and p-bromophenylphosphoric acid; and nitrophenylphosphoric acids such as m-nitrophenylphosphoric acid.

Further, examples of the diphenylphosphoric acid derivatives include di(alkyl-substituted phenyl)phosphoric acids such as diphenylphosphoric acid, di(o-toluyl)phosphoric acid, di(p-toluyl)phosphoric acid, di(o-ethylphenyl) phosphoric acid, di(p-ethylphenyl)phosphoric acid and di(p-isopropylphenyl)phosphoric acid; di(halogen-substituted phenyl)phosphoric acids such as di(o-chlorophenyl) phosphoric acid, di(p-chlorophenyl)phosphoric acid and di(p-bromophenyl)phosphoric acid; and di(nitrophenyl) phosphoric acids such as di(m-nitrophenyl)phosphoric acid.

Furthermore, the phosphorous acid compounds in each of which a hydrogen atom of phosphorous acid is substituted by a phenyl group-containing functional group include phenylphosphorous acid derivatives represented by the following general formula (V), and examples thereof include phenylphosphorous acid; di(alkyl-substituted phenyl) phosphorous acids such as diphenylphosphorous acid, di(o-toluyl)phosphorous acid, di(p-toluyl)phosphorous acid, di(o-ethylphenyl)phosphorous acid, di (p-ethylphenyl) phosphorous acid and di(p-isopropylphenyl)phosphorous acid; di(halogen-substituted phenyl)phosphorous acids such as di(o-chlorophenyl)phosphorous acid, di(p-chlorophenyl) phosphorous acid and di(p-bromophenyl)phosphorous acid; and di(nitrophenyl)phosphorous acids such as di(m-nitrophenyl)phosphorous acid.

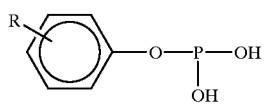

(V)

wherein R represents a hydrogen atom, an alkyl group having 1 to 5 carbon atoms, a halogen atom or a nitro group.

The use of the organic phosphoric acid compounds as the dopants decreases the water absorption of the solid polymer electrolyte membranes comprising the acid-doped meta type polyaniline lower than that of the meta type polyaniline, resulting no occurrence of wrinkles caused by water absorption even in the presence of water.

Usually, the doping is carried out by the following three methods:

(1) Method of blending a polymer (meta type polyaniline) with a dopant (acid component) in a solvent in which the polymer, the dopant and an acid-doped polymer obtained by doping the polymer with the acid component are all soluble to conduct film formation and doping at the same time (solution blend method);

(2) A method of immersing a polymer film in a dopant solution (immersing method); and (3) A method of bringing a polymer solution into contact with a dopant solution at an interface to conduct film formation and doping at the same time (interfacial coagulation method).

For the doping for preparing the meta type polyanilines of the invention, the above-mentioned (1) solution blend method is particularly preferred.

In the invention, the solvents used in the solution blend method are required to dissolve not only the meta type polyanilines and the dopants, but also the acid-doped meta type polyanilines (proton conducting polymers) produced. For this reason, the solvents such as NMP, DMSO, DMAc and DMF usually used as the solvents for the meta type polyanilines can not be used because of very low solubility of the acid-doped meta type polyanilines produced therein. The acid-doped meta type polyanilines produced are dissolved only in strong acids such as concentrated sulfuric acid and methanesulfonic acid. However, it is difficult to handle these strong acids after film formation. Consequently, the solvent used in the solution blend method is preferably trifluoroacetic acid.

In the solution blend method, the temperature at which the meta type polyanilines are dissolved in the solvents is from room temperature to 200° C., and preferably from 40° C. to 120° C. The concentration of the meta type polyanilines contained in the solutions is form 1% to 50% by weight, and preferably from 5% to 30% by weight.

The solution blend method has the advantage that the organic phosphoric acid compounds, preferred dopants in the invention, can be used.

In the solution blend method, meta type polyaniline powder is dissolved in the solvent such as trifluoroacetic acid at the above-mentioned temperature, and then, a specified amount of the dopant is added thereto, followed by stirring at room temperature. After stirring overnight, the homogenized solution is cast on a polytetrafluoroethylene (PTFE) sheet. Then the solvent is removed at 0° C. to 100° C., preferably at about 40° C., at ordinary pressure, followed by vacuum drying at room temperature to 200° C., preferably at about 80° C. The thickness of the resulting meta type polyaniline film is usually from 10 μm to 200 μm, and preferably from 30 μm to 150 μm. The dope amount can be calculated from the charged amount ratio of the meta type polyaniline to the dopant.

When the strong acids are used as the dopants, the immersing method can also be used. The strong acids have high affinity for water and methanol, so that highly concentrated dopant solutions can be easily prepared. For example, when PBI is used as the polymer and phosphoric acid is used as the dopant, a methanol solution having a phosphoric acid concentration of about 80% by weight is used as the dopant solution for conducting doping with 5 molecules of phosphoric acid per repeating structure unit of PBI. The immersing method requires such highly concentrated dopant solutions, so that it can not be employed as the doping method in the invention, except for the case that the strong acids are used as the dopants.

For preparing meta type polyaniline films used in the immersing method, meta type polyaniline solutions are first prepared. Solvents for preparing the meta type polyaniline solutions include, for example, NMP, DMSO, DMAc and DMF.

The meta type polyaniline solution is prepared usually at room temperature to 200° C., preferably at room temperature to 120° C. Usually, for homogeneously dissolving the meta type polyaniline, the solution is heated below the boiling point of the solvent, stirred to dissolve the meta type polyaniline, and cooled to room temperature. Then, the solution of the meta type polyaniline is adjusted so as to give a viscosity of 50 to 4,000 poises, preferably 400 to 600 poises, at 30° C. The viscosity of the above-mentioned meta type polyaniline solution depends on the temperature, and the degree of polymerization and solution concentration of the meta type polyaniline. In general, when the viscosity of the meta type polyaniline solution is less than 50 poises, film formation itself is difficult. On the other hand, exceeding 4,000 poises results in too high viscosity, which makes it difficult to prepare homogeneous films.

The solution of the meta type polyaniline thus obtained can be cast on, for example, glass plates, and the solvent is removed by an ordinary method to prepare meta type polyaniline films.

The thickness of the resulting meta type polyaniline film is usually from 10 μm to 200 μm, and preferably from 30 μm to 150 μm.

Solvents for the dopant solutions include tetrahydrofuran (THF), water, methanol, ethanol, n-hexane and methylene chloride. In this case, the concentration of the dopant solution is preferably from 10% to 95% by weight. When the concentration is less than 10% by weight, the dope amount is decreased to cause reduced proton conductivity of the resulting dope film. On the other hand, exceeding 95% by weight results in dissolution of the meta type polyaniline film in the dopant solution. The dopant solution is prepared at room temperature, at which usually, the dopant is easily homogeneously dissolved.

In the immersing method, the meta type polyaniline films formed from the meta type polyaniline solution as described above are immersed in the dopant solution at room temperature for 5 to 72 hours, followed by vacuum drying at 40° C. to 80° C. Then, the dope amount is calculated from an increase in weight from before doping to after doping.

When the organic phosphoric acid compounds are used as the dopants in the immersing method, the conductivity of the resulting acid-doped meta type polyanilines (proton conducting polymers) is lowered, because the acid dissociation constant of the organic phosphoric acid compounds is low. Further, the organic phosphoric acid compounds are large in size as the dopants, so that diffusion thereof inside the meta type polyanilines is anticipated to be difficult. Furthermore, different from the strong acids, the organic phosphoric acid compounds are low in the solubility in solvents, and it is therefore difficult to obtain the highly concentrated solutions required for the dopant solutions. In the invention, therefore, the solution blend method is preferably used.

As described above, the proton conducting polymers of the invention are obtained by doping the meta type polyanilines with the acid components.

The proton conductivity of the proton conducting polymers is measured, using the vacuum-dried proton conducting polymer films as samples, as follows.

Complex impedance measurements are made with an impedance analyzer "YHP 4192A" manufactured by YOKOGAWA-HEWLETT PACKARD, LTD. in a dried state at 750 mV, using four terminals or two terminals. The direct current component R is read from Cole-Cole plots, and the proton conductivity can be calculated therefrom.

The proton conductivity of a proton conducting polymer obtained by doping the meta type polyaniline of the invention with 0.75 molecule per repeating unit of diphenylphosphoric acid by the solution blend method is from $1.0 \times 10^{-2.5}$ to $1.0 \times 10^{-1.8}$ S/cm at 75° C. to 126° C. On the other hand, the proton conductivity of conventional acid-doped PBI obtained by doping PBI with 1.0 molecule per N—H group of diphenylphosphoric acid is from $1.0 \times 10^{-3.5}$ to $1.0 \times 10^{-2.8}$ S/cm at 75° C. to 126° C. As can be seen from the above, the proton conducting polymer, the meta type polyaniline obtained in the invention, shows excellent proton conductivity, compared with conventional acid-doped PBI.

The proton conducting polymers, the meta type polyanilines of the invention, can be formed into the solid polymer electrolyte membranes used in fuel cells, particularly in DMFCs.

The proton conducting polymer films obtained by the above-mentioned solution blend method or immersing method can be used as the solid polymer electrolyte membranes for fuel cells.

The methanol barrier property of the solid polymer electrolyte membrane is measured in the following manner.

That is to say, the solid polymer electrolyte membrane having an area of 9 cm² is incorporated into a fuel cell to partition the cell into an anode chamber and a cathode chamber, and the cell is sealed. Keeping the cell temperature at 70° C., a 1 M aqueous solution of methanol pressurized to 0.5 kgf/cm² is supplied into the anode chamber at 0.5 ml/minute. Dry air is allowed to flow in the cathode chamber on the opposite side through an inlet at ordinary pressure, and a membrane-permeated material is collected with a cold trap of liquid nitrogen from a gas exhausted through an outlet. The permeation amount of methanol (g/cm²) is calculated from the weight of the collected material (membrane-permeated material) and the composition determined by gas chromatographic analysis, which is employed as evaluation results of methanol permeability.

The membranes comprising the proton conducting polymers, the meta type polyanilines of the invention, are excellent in methanol barrier property.

The meta type polyanilines or acid-doped meta type polyanilines of the invention can also be mixed with catalyst-carrying particles to use the resulting products as electrodes of fuel cells.

The electrodes of fuel cells usually include ones obtained by directly applying electrode paste comprising the fine catalyst particles carried on the porous particles and an alcohol solution of the solid polymer electrolyte which is an ion conductive component, onto a gaseous diffusion electrode base material, and removing the solvent. The electrode paste can also be directly applied onto the solid polymer electrolyte membranes.

The raw materials for the fine catalyst particles include platinum and an alloy of platinum and at least one selected from the group consisting of chromium, titanium and tungsten, and platinum is preferred.

The fine catalyst particles are used in the state that they are carried on the porous particles. As the porous particles, highly structured carbon particles having large average specific surface area, which are produced by the Ketjen process or the acetylene process, are suitably used.

The fine catalyst particles carried on the porous particles include a platinum catalyst carried on carbon, which is prepared by allowing carbon to support 10% to 30% by weight of platinum by a conventional method.

Methods for mixing the acid-doped meta type polyaniline of the invention with the fine catalyst particles carried on the porous particles (hereinafter referred to as a "platinum catalyst carried on carbon") include, for example, a method of mixing a meta type polyaniline-diphenylphosphoric acid blend solution obtained by the solution blend method with the platinum catalyst carried on carbon to form electrode paste to be applied onto the gaseous diffusion electrode base material.

Further, the methods for mixing the acid-doped meta type polyanilines with the platinum catalysts carried on carbon also include a method of mixing a powder of the acid-doped meta type polyaniline and the platinum catalyst carried on carbon with a solvent to form electrode paste.

As the above-mentioned solvents used in mixing the acid-doped meta type polyanilines with the platinum catalysts carried on carbon by stirring, any solvents can be used as long as they disperse the porous particles well and do not deteriorate the functions of the solid polymer electrolyte membranes. For example, ethylene glycol and a 50/50% (by volume) mixture of ethylene glycol monoisopropyl ether and isopropanol are suitably used. Further, solvents unreactive to oxygen such as water, ketones and esters can be added to and mixed with them to such a degree that rheological characteristics such as the kinematic viscosity of the electrode paste for formation of electrode catalyst layers are not impaired.

The order of mixing the acid-doped meta type polyaniline powder, the platinum catalyst carried on carbon and the solvent may be any, and can be appropriately selected. The resulting electrode paste is applied onto the gaseous diffusion electrode base materials by conventional procedures.

Meta type polyaniline powder may be used in place of the above-mentioned acid-doped meta type polyaniline powder.

Further, the methods for mixing the meta type polyanilines with the platinum catalysts carried on carbon also include a method of mixing the platinum catalyst carried on carbon with a solution of the meta type polyaniline for coating.

The quantitative ratio of the platinum catalyst carried on carbon to the meta type polyaniline is the same as with the above-mentioned acid-doped meta type polyaniline. The coated platinum catalysts carried on carbon are applied onto the gaseous diffusion electrode base materials and/or solid polymer electrolyte membranes as electrode paste with the alcohol solvents, similarly to the above.

Here, the gaseous diffusion electrode base materials are so-called electron conductive supports, which include, for example, carbon paper and carbon cloth. In particular, the carbon paper is a porous base material, and particularly has many pores (voids) because it is produced by the papermaking method.

The gaseous diffusion electrode base materials and/or solid polymer electrolyte membranes can be coated with the electrode paste by the conventional kiss coat method, doctor blade method and screen printing method.

Then, the electrode paste layers applied and fixed onto the gaseous diffusion electrode base materials are heated and dried in an inert gas atmosphere to remove the organic solvents contained in the paste, thereby forming the catalyst layers comprising the platinum catalysts carried on carbon and the proton conducting polymers on the gaseous diffusion electrode base materials.

In this case, nitrogen or argon can be suitably used as the inert gas. First, alcohol components are removed at 50° C. to 80° C. at ordinary pressure, and then, organic solvents such as ethylene glycol can be removed by heating at the same temperature under reduced pressure.

The catalyst layers formed on the gaseous diffusion electrode base materials, which are obtained according to the above-mentioned steps, can be attached to the solid polymer electrolyte membranes by thermocompression bonding. The attachment can be suitably carried out preferably at a temperature of 120° C. to 150° C. at a pressure of 20 to 200 kg/cm$^2$ by hot pressing. Under the conditions of a temperature of less than 120° C. and a pressure of less than 200 kg/cm$^2$, the attachment is insufficient. On the other hand, under the conditions of a temperature exceeding 150° C. and a pressure exceeding 200 kg/cm$^2$, there is a fear of decomposition of the proton conducting polymers. Although the hot pressing time varies with the attachment temperature and pressure, it is usually from 30 to 120 seconds. A hot pressing time of less than 30 seconds results in a fear of insufficient attachment, whereas exceeding 120 seconds results in a fear of decomposition of the proton conducting polymers, or deterioration or deformation of the gaseous diffusion electrode base materials and/or the solid polymer electrolyte membranes.

In the above-mentioned steps, polytetrafluoroethylene resin solutions and thickening agents ordinarily used as electrode constituting material components can be safely mixed, in addition to the platinum catalysts carried on carbon, the proton conducting polymers and the solvents.

The catalyst electrodes in which surfaces of the fine catalyst particles are covered with the proton conducting polymers of the invention show the effect of preventing the catalysts from being poisoned without a decrease in catalytic activity. The amount of the proton conducting polymers that have covered the catalyst particles can be evaluated by measuring the amount of carbon monoxide (CO) absorbed.

The solid polymer electrolytes comprising the acid-doped meta type polyanilines of the invention are excellent in proton conductivity and methanol barrier property, and also very high in dope stability in aqueous solutions of methanol. They are therefore very useful as solid polymer electrolyte membrane materials for fuel cells, particularly for liquid supply type DMFCs. Further, the electrodes containing the meta type polyanilines of the invention and the fine catalyst particles carried on the porous particles are high in activity, so that they are very useful as electrodes of fuel cells.

The present invention will be illustrated with reference to examples in more details below, but these examples are not intended to limit the scope of the present invention. Parts and percentages in the examples and comparative examples are on a weight basis, unless otherwise specified. Various evaluations were conducted as follows.

IR Absorption Spectrum

The IR absorption spectrum was measured by the reflective diffusion method, using a 20DXB FT-IR spectrometer manufactured by Nicolet Analytical Instruments.

Inherent Viscosity ($\eta_{inh}$)

The relative viscosity ($\eta_{rel}$) of a 0.5% concentrated sulfuric acid solution of a polymer was measured with a capillary viscometer, and the inherent viscosity was calculated therefrom.

Proton Conductivity

A vacuum-dried proton conducting polymer film was used as a sample for proton conductivity measurements. Complex impedance measurements were made with an impedance analyzer "YHP 4192A" manufactured by YOKOGAWA-HEWLETT PACKARD, LTD. in a dried state at 750 mV, using two terminals. The direct current component R was read from Cole-Cole plots, and the proton conductivity (S/cm) was calculated therefrom.

Methanol Barrier Property

A solid polymer electrolyte membrane having an area of 9 cm$^2$ was incorporated into a fuel cell to partition the cell into an anode chamber and a cathode chamber, and the cell is sealed. Keeping the cell temperature at 70° C., a 1 M aqueous solution of methanol pressurized to 0.5 kgf/cm$^2$ was supplied into the anode chamber at 0.5 ml/minute. Dry air was allowed to flow in the cathode chamber on the opposite side through an inlet at ordinary pressure, and a membrane-permeated material is collected with a cold trap of liquid nitrogen from a gas exhausted through an outlet. The permeation amount of methanol (g/cm$^2$) was calculated from the weight of the collected material and the composition determined by gas chromatographic analysis, which was employed as evaluation results of the methanol barrier property.

EXAMPLE 1

(Preparation of Meta Type Polyaniline)

Aniline (16.5 ml) was dissolved in 248 ml of NMP to prepare an NMP solution of aniline. Then, 41.3 g of ammonium peroxodisulfate was added to the NMP solution of aniline at −5° C. to 0° C. for 12 hours, followed by stirring overnight while gradually restoring the temperature to room temperature. The reaction solution was poured into a large excess of deionized water to obtain a solid material. The solid material thus obtained was repeatedly washed with deionized water and acetone, followed by washing with deionized water. Then, the solid material is vacuum dried at 100° C. to obtain a meta type polyaniline. The resulting meta type polyaniline had a inherent viscosity $\eta_{inh}$ of 0.22.

The meta type polyaniline thus obtained blended with 0.5 molecule of diphenylphosphoric acid per repeating unit and cast to obtain an acid-doped meta type polyaniline (proton conducting polymer) film. An IR chart thereof is shown in FIG. 1. Absorption peaks at 1,530 cm$^{-1}$ and 1,610 cm$^{-1}$ assigned to phenyl groups bonded at the meta-positions were confirmed. Absorption peaks at 1,170 cm$^{-1}$ and 1,250 cm$^{-1}$ assigned to phenyl groups bonded at the para-positions were also confirmed. As to the bonding of aromatic rings in repeating units of the above-mentioned polyaniline, 97 mole percent of the aromatic rings were bonded at the meta-positions.

EXAMPLE 2

A meta type polyaniline was obtained in the same manner as with Example 1 with the exception that ammonium peroxodisulfate was added for 6 hours. The resulting meta type polyaniline had a inherent viscosity $\eta_{inh}$ of 0.07. As to the bonding of aromatic rings in repeating units of the above-mentioned polyaniline, 85 mole percent of the aromatic rings were bonded at the meta-positions.

EXAMPLE 3

A meta type polyaniline was obtained in the same manner as with Example 1 with the exception that ammonium peroxodisulfate was added all at once. The resulting meta type polyaniline had a inherent viscosity $\eta_{inh}$ of 0.13. As to the bonding of aromatic rings in repeating units of the above-mentioned polyaniline, 81 mole percent of the aromatic rings were bonded at the meta-positions.

EXAMPLE 4

A meta type polyaniline was obtained in the same manner as with Example 1 with the exception that 124 ml of NMP was used. The resulting meta type polyaniline had a inherent viscosity $\eta_{inh}$ of 1.14. As to the bonding of aromatic rings in repeating units of the above-mentioned polyaniline, 81 mole percent of the aromatic rings were bonded at the meta-positions.

Comparative Example 1
(Preparation of Polyaniline by Conventional Method)

Aniline (20 ml) was dissolved in 300 ml of a 1 M aqueous solution of $H_2SO_4$, and the resulting solution was kept at $-5°$ C. to $-3°$ C. Then, 62.38 g of ammonium peroxodisulfate dissolved in 100 ml of deionized water was added thereto for 6 hours, followed by stirring at $-5°$ C. to $-3°$ C. for 2 hours. The PH of the reaction solution was from 1 to 2. The reaction solution was poured into a large excess of deionized water to obtain a solid material. The solid material thus obtained was repeatedly washed with deionized water and acetone, followed by washing with deionized water. Then, the solid material is vacuum dried at 100° C. to obtain a polyaniline.

The polyaniline thus obtained was blended with 0.5 molecule of diphenylphosphoric acid per repeating unit and cast to obtain an acid-doped polyaniline (proton conducting polymer) film. No absorption peaks at 1,530 $cm^{-1}$ and 1,610 $cm^{-1}$ assigned to phenyl groups bonded at the meta-positions were observed in an IR chart thereof. Absorption peaks at 1,170 $cm^{-1}$ and 1,250 $cm^{-1}$ assigned to phenyl groups bonded at the para-positions were confirmed. As to the bonding of aromatic rings in repeating units of the above-mentioned polyaniline, 0 mole percent of the aromatic rings were bonded at the meta-positions.

Reference Example 1
(Production of Acid-Doped Polyaniline Film)

In 20.0 ml of trifluoroacetic acid, 2.00 g of the meta type polyaniline obtained in Example 1 was dissolved at a concentration of 10%, and diphenylphosphoric acid [R=H in general formula (IV)], a commercially available special grade chemical, was added thereto in an amount of 0.75 molecule per repeating unit of the charged meta type polyaniline, followed by stirring at room temperature overnight. The homogenized solution was cast on a PTFE sheet on a hot plate by using a doctor blade, and the solvent was evaporated at 40° C. Then, vacuum drying was carried out at 80° C. to obtain an acid-doped meta type polyaniline (proton conducting polymer) film. The resulting acid-doped meta type polyaniline film had a thickness of 50 μm.

Figure 2:
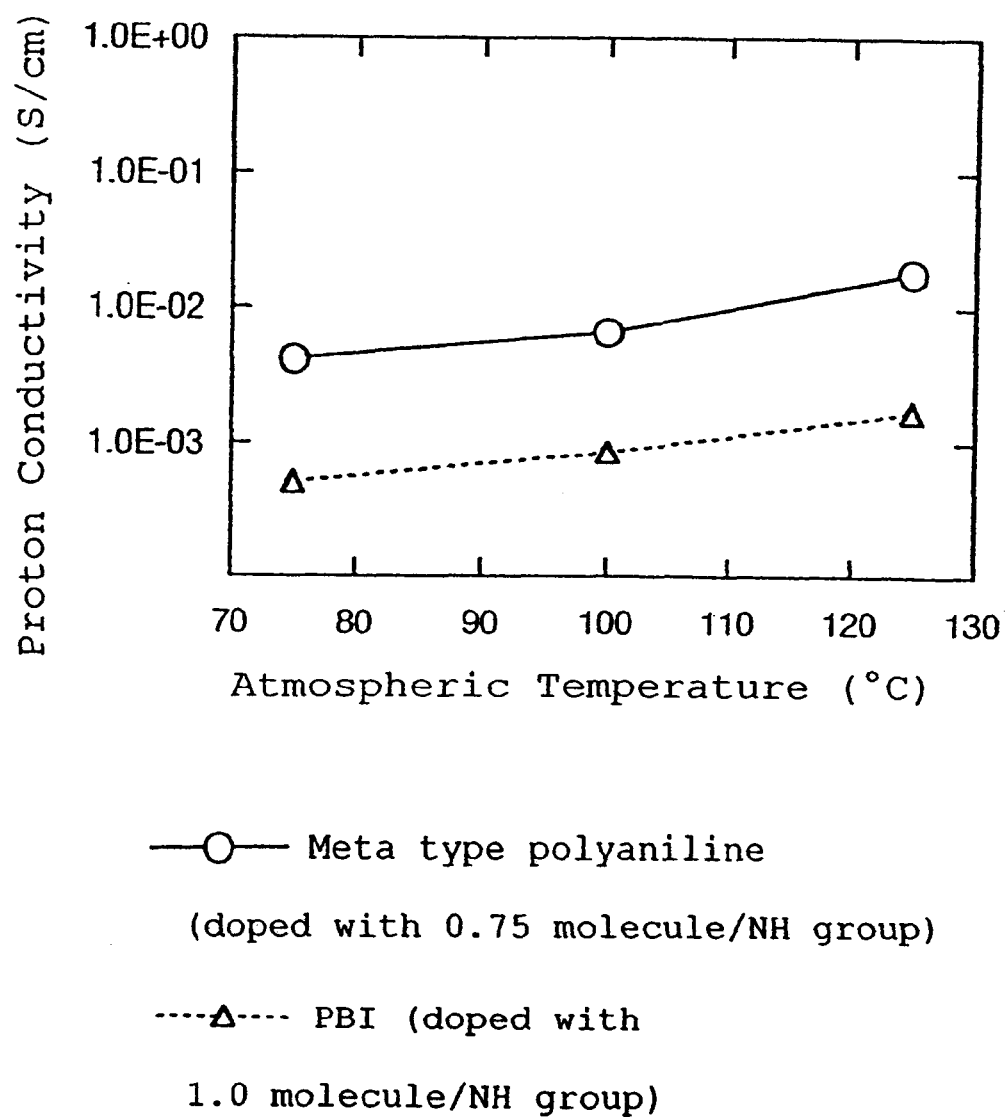
FIG. 2 is a graph showing the relationship between the proton conductivity and the atmospheric temperatures for an acid-doped polyaniline film of Reference Example 1 and an acid-doped PBI film of Reference Example 3.

The relationship between the proton conductivity of the resulting acid-doped meta type polyaniline film and atmospheric temperatures is shown in the graph of FIG. 2.

Using this acid-doped meta type polyaniline film as a solid polymer electrolyte membrane, the methanol permeability was evaluated. The permeation rate of methanol was $1.5 \times 10^{-6}$ $g/cm^2$·minute.

Reference Example 2
(Preparation of PBI)

Poly[2,2'-(m-phenylene)-5,5'-bibenzimidazole] was used as PBI, an imidazole ring-containing polymer. PBI powder (trade name: CELAZOLE) manufactured by Aldrich Chemical Co., Inc. was dissolved in DMAc at a concentration of 10%, and the resulting solution was filtered under pressure. Then, the solution was coagulated in distilled water, and the resulting purified product was vacuum dried, pulverized and used as PBI powder.

Reference Example 3
(Production of Acid-Doped PBI Film)

An acid-doped PBI film was obtained in the same manner as with Reference Example 1 with the exception that 2.00 g of PBI powder was used and the amount of diphenylphosphoric acid was changed to 1 molecule per repeating unit. The resulting acid-doped PBI film had a thickness of 50 μm.

The resulting acid-doped PBI film showed no decrease in weight even after extraction with an aqueous solution of methanol, which revealed that the dopant was not eliminated. Further, the water absorptivity of the acid-doped PBI film was evaluated. As a result, an increase in weight was 2.4%, and the film scarcely showed the water absorptivity.

The relationship between the proton conductivity of the acid-doped PBI film and atmospheric temperatures is shown in the graph of FIG. 2.

Using this acid-doped PBI film as a solid polymer electrolyte membrane, the methanol permeability was evaluated. The permeation rate of methanol was $1.82 \times 10^{-6}$ $g/cm^2$·minute.

Reference Example 4
(Nafion 112 Film)

Using a hydrated membrane of Nafion 112 manufactured by E. I. du Pont de Nemours and Company as a solid polymer electrolyte membrane, the methanol permeability was evaluated. The permeation rate of methanol was $1.7 \times 10^{-3}$ $g/cm^2$·minute.

Reference Example 5
(Nafion 117 Film)

Using a hydrated membrane of Nafion 117 manufactured by E. I. du Pont de Nemours and Company as a solid polymer electrolyte membrane, the methanol permeability was evaluated. The permeation rate of methanol was $1.2 \times 10^{-3}$ $g/cm^2$·minute.

From the results of FIG. 2, the acid-doped meta type polyaniline film of Reference Example 1 showed extremely high proton conductivity, compared with the acid-doped PBI film of Reference Example 3. The dopant amount in Reference Example 1 was 0.75 molecule per repeating unit, and that in Reference Example 3 was 1 molecule per repeating unit. The acid-doped meta type polyaniline film of Reference Example 1 showed high proton conductivity, although the dopant amount thereof was smaller than that of the acid-doped PBI film of Reference Example 3. From the above, it is considered that the meta type polyaniline is high in N—H group density compared with PBI, because of its simple molecular structure, which causes an increase in proton conductivity when doped with the acid.

Further, the methanol barrier property of the acid-doped meta type polyaniline film of Reference Example 1 was very high, compared with the conventional hydrated membranes of Nafion 112 and Nafion 117.

The solid polymer electrolytes comprising the acid-doped meta type polyanilines of the invention are excellent in proton conductivity and methanol barrier property, and very high in dope stability in aqueous solutions of methanol. They are therefore very useful as solid polymer electrolyte membrane materials for fuel cells, particularly for liquid supply type DMFCs. Further, the catalyst electrodes containing the meta type polyaniline of the invention are high in activity, so that they are very useful as catalyst electrodes of fuel cells.

What is claimed is:

1. A method for producing a meta type polyaniline, which comprises polymerizing aniline in water or at least one organic solvent selected from the group consisting of N-methyl-2-pyrrolidone, N,N-dimethyl sulfoxide, N,N-dimethylacetamide and N,N-di-methylformamide, in the presence of at least one oxidizing agent selected from the group consisting of ammonium peroxodisulfate, iron(III) chloride, manganese dioxide and hydrogen peroxide, at −20° C. to 50° C.

2. The method according to claim 1, wherein when the polymerization reaction is conducted in water, the PH of a reaction solution is adjusted to 7 or more.

3. The method according to claim 1 or 2, wherein said aniline has at least one substituent on its aromatic ring.

* * * * *

UNITED STATES PATENT AND TRADEMARK OFFICE
CERTIFICATE OF CORRECTION

PATENT NO. : 6,303,053 B1
DATED : October 16, 2001
INVENTOR(S) : Akita et al.

Page 1 of 1

It is certified that error appears in the above-identified patent and that said Letters Patent is hereby corrected as shown below:

<u>Column 7,</u>
Line 53, delete "... solution is form 1% ..." and insert -- ... solution is from 1% ... --

Signed and Sealed this

Twenty-first Day of May, 2002

Attest:

Attesting Officer

JAMES E. ROGAN
*Director of the United States Patent and Trademark Office*